United States Patent [19]

Zöellner

[11] Patent Number: 4,492,351

[45] Date of Patent: Jan. 8, 1985

[54] HOUSING FOR TAPE CASSETTE

[75] Inventor: Rainer Zöellner, Dietenhofen, Fed. Rep. of Germany

[73] Assignee: Grundig E.M.V., Fuerth, Fed. Rep. of Germany

[21] Appl. No.: 502,467

[22] Filed: Jun. 9, 1983

[30] Foreign Application Priority Data

Jun. 9, 1982 [DE] Fed. Rep. of Germany ....... 3221761

[51] Int. Cl.³ .......................... G03B 1/04; G11B 15/32
[52] U.S. Cl. ..................................... 242/197; 206/387
[58] Field of Search ............. 242/71.1, 71.2, 197–200; 352/72, 78; 360/93, 95, 132; 206/387, 389

[56] References Cited

U.S. PATENT DOCUMENTS 3,701,495 10/1972 Holliday .............................. 242/197
3,955,779 5/1976 Bielik ................................... 242/199
4,030,602 6/1977 Muller ................................. 206/404
4,092,686 5/1978 Shimizu ................................. 360/95
4,130,848 12/1978 Amano ................................ 360/132
4,152,738 5/1978 Schulz ................................... 360/95
4,306,690 12/1981 Izaki ................................... 242/200

Primary Examiner—Leonard D. Christian
Attorney, Agent, or Firm—Kane, Dalsimer, Kane, Sullivan & Kurucz

[57] ABSTRACT

The invention relates to a container or housing for receiving a small mini tape cassette consisting of at least two movable half sections and adopting it for use in a larger recording/playback device whereby the sections are separated and the tape brought into the pici-up position for the larger device in a relatively automatic manner.

28 Claims, 4 Drawing Figures

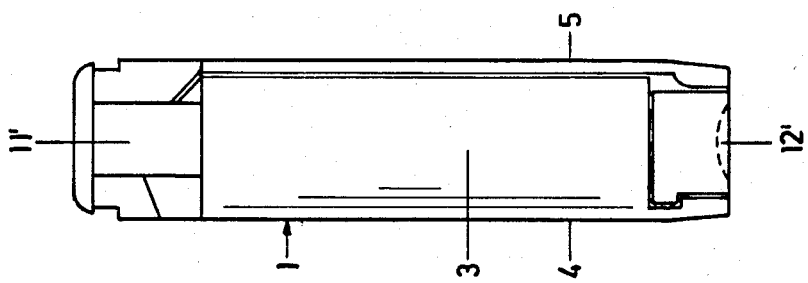
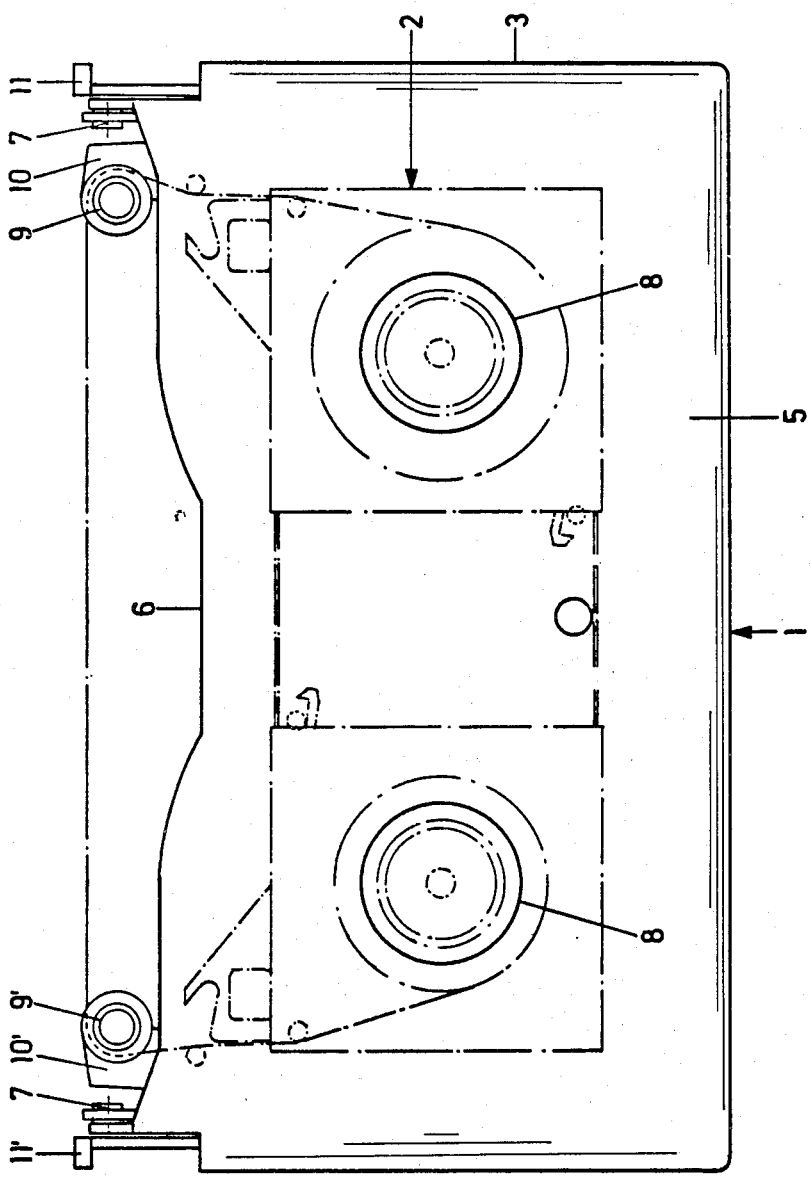

HOUSING FOR TAPE CASSETTE

FIELD OF THE INVENTION

The present invention is directed towards providing a housing or receptacle for an adjustable tape cassette cartridge so as to enable its use in a device which requires a larger cartridge.

BACKGROUND OF THE INVENTION

In the ever expanding audio and video recording and playing market, it has become popular to miniaturize many of the components and often the devices themselves. For example, portable video (and audio) recorders have become smaller in size and utilize a relatively small tape cassette for recording purposes. Unfortunately, present playback devices, particularly those used in home video systems, are set up to utilize a relatively large cartridge so as to enable long playing through increased tape volume. Similarly, in miniaturized recorders, often it may be desirable to utilize the tape cassette in a tape player/recorder which normally takes only a larger tape cassette.

These different requirements in a device for home use as compared to portable devices, usually requires the use of two different cassettes, i.e., a small and light cassette for a portable device and a long playing cassette for the home device. Accordingly, a need and desire has arisen to allow the use of the smaller cassette in the larger home audio and video device.

In this regard, attempts have been made to provide for such a conversion by adjusting the home video device. However, such structures are very involved, since the mechanics for driving the winding coils of tape cassettes having different axial distances would be very complicated. Alternatively, to compensate for the different axis distance in the different cassette sizes would be to adjust the cassette. For example, a small cassette can be adjustable to that of a standard cassette for a home video device through the use of a cassette as disclosed in my copending U.S. patent application Ser. No. 375,208, filed May 5, 1982, entitled "Tape Cassette", the disclosure of which is incorporated herein by reference.

In this application, there is disclosed a tape cassette having its winding elements encompassed in cassette housing parts that are separable longitudinally to change the distance between the winding coils so that smaller cassettes can adjust to the larger axial distance between the wind-up elements of the home video. While this tape cassette has proven satisfactory, it has become desirable to further improve thereon while remaining relatively uncomplicated, and inexpensive.

SUMMARY OF THE INVENTION

It is therefore an object of the present invention to provide a housing or cartridge for receiving an adjustable small or mini-cassette, which fulfills all required functions for inserting the cassette into a larger home video device and the like.

It is a further object of the present invention to provide for housing for an adjustable small or mini-cassette which is relatively automatic in its operation is relatively simple, effective and yet easy to use.

In this regard, the present invention provides for a housing for receiving a mini-tape cassette with the housing being of a standardized size for use in a larger home video system, for example, the housing accepts the mini-cassette which consists of at least two sections movable towards or away from each other so as to be adjustable in size. Provided within the housing are two symmetrically disposed pivot arms with tape guiding elements thereon which engage the tape of the mini-cassette and bring it into a position so as to correspond to the position of the standard cassette for the particular video machine etc. in which it is used.

The housing includes a relatively rigid rectangular frame having a bottom plate and a pivotable lid or cover to allow insertion and removal of the cassette.

One side of the housing is open to allow engagement of the tape to the heads of the device. Recesses are provided in the bottom plate and lid which serve to receive the winding coils of the mini-cassette and maintain the coils therein, during expansion of the cassette therein. In this regard, the mini-cassette is positioned in the housing with its movable sections maintained on respective sliding plates positioned on the bottom plate. These sliding plates serve to center and uniformly separate or expand the mini-cassette. External slides serve automatically to bring the wind-up coils and the magnetic tape of the mini-cassette into the desired position upon the closing of the lid. Additional slides are used to unlock the windings to allow rotation thereof upon its insertion into the video system. The cassette is now ready for insertion into the video player for playing, with the tape and windings properly positioned in this regard. To remove the mini-tape, the external slides are withdrawn from the housing so as to cause the movable slides to return the mini-cassette to its unextended position while causing the pivot arms to retract, and the lid unlocks. A take up drive mechanism in the housing advantageously winds the extra tape freed by the closing of the cassette sections. The mini-cassette can then be withdrawn.

BRIEF DESCRIPTION OF THE PREFERRED EMBODIMENT

Thus by the present invention the aforenoted objects and advantages and others will be realized, the description of which should be taken in conjunction with the drawings, wherein:

FIG. 1 is a top plan view of the cassette housing in the closed condition incorporating the teachings of the present invention, with the mini-cassette contained therein shown in phantom;

FIG. 2 is a side view of the cassette housing incorporating the teachings of the present invention;

DETAILED DESCRIPTION OF THE PREFERRED EMBODIMENT

Figure 3:
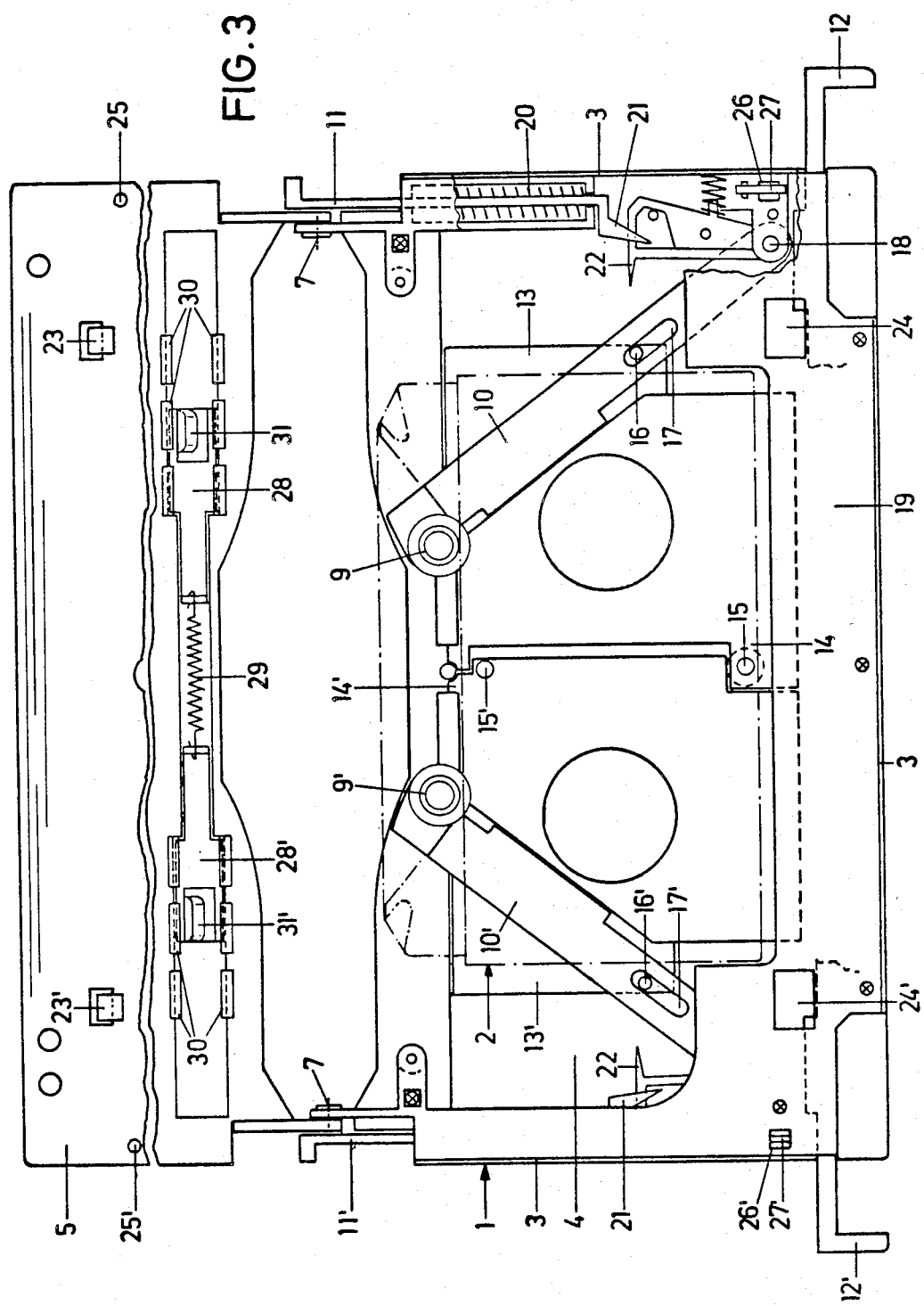
FIG. 3 is a top view of the cassette housing in the open condition with a mini-cassette positioned therein in an unextended condition.

With reference now more particularly to the drawings, in FIG. 1 there is shown a cartridge or housing 1 for receiving a smaller or mini tape cassette 2 of the type for example illustrated in the aforenoted application, and principally depicted in phantom lines in the figures. The housing 1 has outer dimensions which correspond to the standard cassette, i.e., video cassettes suitable for a particular video machine, or any other predetermined size cassette desired. This allows a small cassette used in i.e., portable devices to be played in a video home device which as aforenoted are geared towards taking a much larger tape cassette to allow longer playing time. The tape (magnetic etc.) of the inserted mini-cassette 2 assumes an initial position in the housing 1 as shown in phantom in FIG. 3. The magnetic tape accordingly is so positioned to allow for the tape to be extended out to the proper length which as will be discussed is performed in a relatively automatic fashion.

Initially, the housing 1 for receiving the mini-cassette consists of a rectangular frame 3 with an integrally formed bottom plate 4 and a pivotable lid 5. The frame 3 is open along its longitudinal side 6 so as to allow the magnetic tape to be pulled out to the desired length and engage the heads of the device etc. The lid 5 is connected to the sides of the frame 3 by way of pivot joints at 7 to allow the opening and closing thereof.

Figure 4:
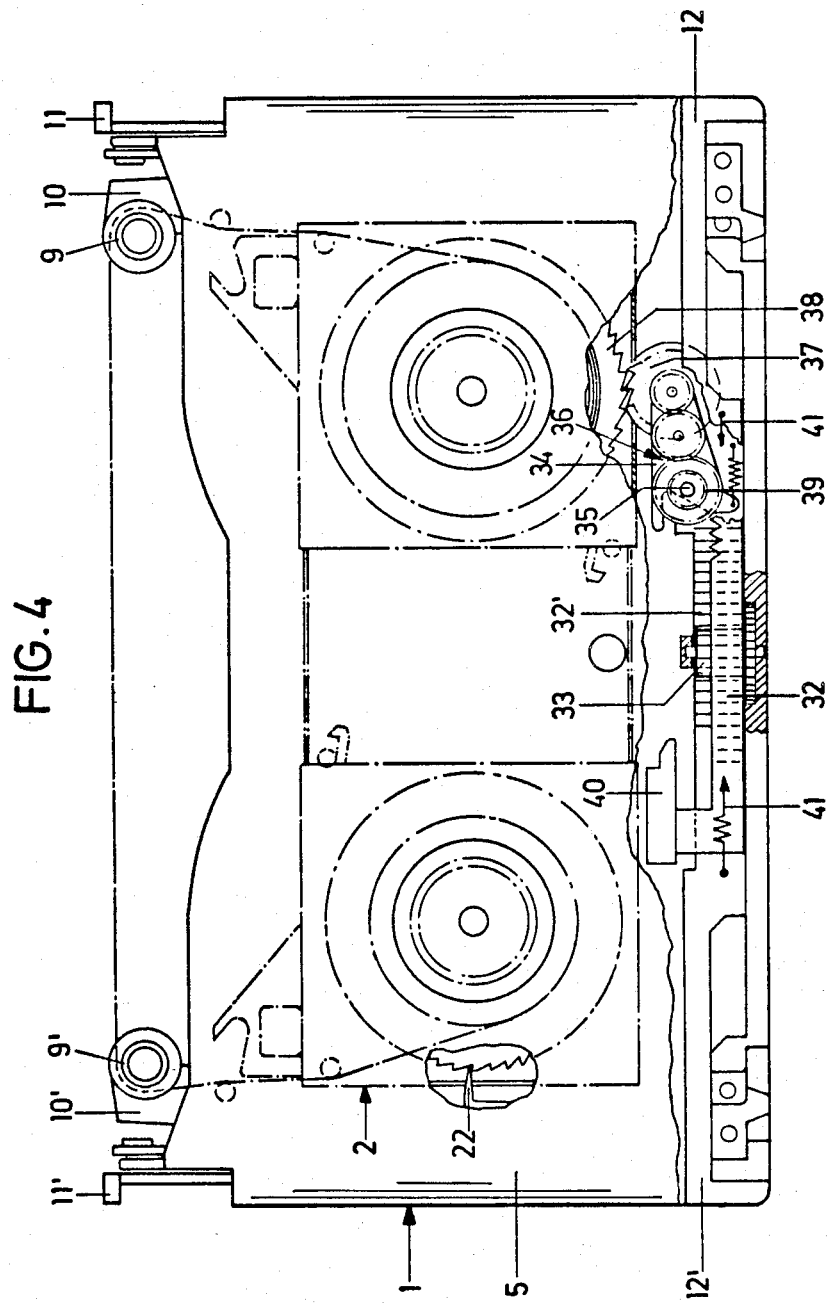
FIG. 4 is a top plan partially broken away view of the cassette housing in the closed position with the mini-cassette contained therein shown in phantom.

Provided in the lid 5 and the bottom plate 4 are corresponding circular or elliptical recesses or openings which allow accessibility to the wind-up coils of the mini-cassette 2 inserted in the housing 1 once the mini-cassette is in proper position as shown in FIGS. 1 and 4.

Once inserted, the magnetic tape of the mini-cassette is brought into proper position and length (predetermined) which corresponds to the size of the cassette normally used in the larger device. This is accomplished by way of two pivoting tape guiding elements 9, 9', each respectively mounted on pivot arms 10, 10' and serve to engage and extend the magnetic tape.

On each side of the frame 3, respective locking slides 11, 11' are provided and are slidably maintained thereby. The upper end of the slides 11, 11' terminate in lips or enlarged areas adjacent the open end 6 of the housing which are engaged upon insertion of the housing into the video device, for purposes that will be discussed.

On the bottom or closed side of the frame 3, there is maintained respective side slides 12, 12' longitudinally movable. The operation of these slides will become more apparent as further discussed herein.

As shown in FIG. 3, the housing is opened with the lid 5 completely tilted back so that the mini-cassette 2 can be inserted without any difficulties. The mini-cassette 2 (shown in phantom) is movable from a first or closed position to a larger or second position by the separation of the opposite portions of the cassette, as discussed in the aforenoted application. However, in order to open the housing 1, two side slides 12, 12' have to be pulled out away from the housing 1 a predetermined amount until they engage abutments provided and remain locked at this position. The withdrawing of slides 12, 12' causes the release of the lid 5 which may be automatically lifted up and away via a torsion spring. In addition, the tape guiding elements 9, 9' and pivot arms 10, 10', are now positioned inwardly as shown in FIG. 3 to allow for inserting the mini-cassette 2 into the opened housing 1. The control of the two pivot arms 10, 10' is performed by respective sliding plates 13, 13' whose movement is controlled via the movement of slides 12, 12' as will be discussed. The sliding plates 13, 13' abutting therewith and mounted on the inner face of the bottom plate 4 of the housing 1. The two sliding plates 13, 13' have respective openings to allow access to the coil winding of the mini-cassette 2 and are guided on their longitudinal sides on the bottom plate 4.

Upon insertion of the mini-cassette 2 the wind-up coils of the cassette 2 engage a guiding flange into the recesses in plates 13, 13'. At the junction of the two sliding plates 13, 13', there is provided overlapping areas at 14, 14' so as to allow the mounting of centering pins 15, 15' on the center line of the housing 1. These centering pins 15, 15' are so positioned to provide exact positioning of the mini-cassette 2 during its insertion into the housing 1. The engagement of these pins 15, 15' with the locking or locking means of the mini-cassette 2 serves to release them automatically allowing the separation or expansion of the mini-cassette selection while centering and coupling the separate cassette sections to the respective sliding plates. Of course any other means of locking the mini-cassette 2 together or their releasing suitable for purpose may be utilized, and the aforenoted pin-hook arrangement should by no means be considered exclusive.

The side slide 12, 12' are coupled with or otherwise engaged to opposite slide plates 13, 13' so that pulling out of the right side slide 12 displaces the left side plate 13' and vice versa. Both slide plates 13, 13' are provided respective cam pins 16, 16' which engage respective longitudinal slots 17, 17' in the pivot arms adjacent the respective plates. The pivot arms 10, 10' are pivotably mounted on the frame 3 by means of support pins 18 as can readily be seen in FIG. 4.

The rectangular frame 3 includes a short portion or cover 19. On the right side of the illustrated figure, a section of cover 19 is removed to show the inner part of the frame 3. In this regard, and representative of both locking slide 11 is shown biased by a tension spring 20. The locking slide 11 is movable in and out of the frame 3 upon insertion of the housing 1 into the player/recorder which causes the lips of the slides 11, 11' to engage a portion thereof forcing the slide inwardly into the frame 3. This causes the opposite end of the slide 11 on which incline 21 is positioned to engage a nipple on pawl 22. Pawl 22 is rotatably supported by pin 18 and spring biased towards the winding coil flange 38. Engagement of incline 21 with the nipple causes the pawl 22 to disengage from the tooth gear or coil flange 38 thereby releasing the wind-up coils of the mini-cassette 2 for the driving thereof. Note that the pawls 21 are so positioned so as to allow for the rotation of the coil winding during expansion of the mini-cassette 2, whereupon once expanded it engages the winding coil flange 38 to prevent any further undesirable rotation until the cassette housing is inserted into the device. Upon removal of the container 1 from the device, the slides 11, 11' return to their original position, releasing the pawls 22 which in turn engage the wind-up coils preventing further rotation thereof.

The lid 5 illustrated in a broken off form in FIG. 3 is provided with two symmetrically disposed engagement hooks 23, 23' mounted on the inner side facing the lid 5 at the end opposite that rotatably coupled to joint 7 and serve to lock the lid by engaging rectangular cut outs 24, 24' located on portion 19. During the closing of the lid 5, two pins 25, 25' vertically disposed on the inner surface thereof and located at the end of the lid 5 near engagement hooks 23, 23' enter into respective cut outs 26, 26' provided in the frame 3. The pins 25, 25' serve to engage pawls 27, 27' which at this point had been locking the side slides 12, 12' in their withdrawal position. Engagement of pins 25, 25' with pawls 27, 27' serve to releases them and accordingly slides 12, 12'.

Also, on the inside of the lid 5, two release slides 28, 28' are mounted which are connected with each other by means of a torsion spring 29 mounted in longitudinal guides 30. The release slides 28, 28' are provided with locking shoulders 31, 31' which engage respective cut outs in the half portion of the mini-cassette 2 and which release the associated coil locking of the mini-cassette 2 when locking the lid 5. The release slides 28, 28' move together with respective portions of the mini-cassette 2.

With reference to FIG. 4, the container 1 is illustrated with lid 5 closed, with the mini-cassette 2 located therein (shown in phantom) and prior to insertion into the playing/recording device. Frame 3 is illustrated in a breakaway manner to illustrate further the operation of side slides 12, 12'. In this regard, side slides 12, 12' are provided with respective gear racks 32, 32' oppositely disposed on either side of a coupling gear 33 positioned at approximately the center of the lower portion of frame 3. This results in having side slides 12, 12' move equally upon movement of only one of the slides. Furthermore, as a result of this arrangement, the associated slide plates 13, 13' and the pivot arms 10, 10' are always simultaneously moved and pivoted equally.

Note that coupling gear 33 is provided with a dampening device which is active in only one rotating direction, that being when there is pressure on slides 12, 12' to return to a certain position (i.e., inverted) as will be discussed.

The rack gear part of the left side slide 12' as aforenoted is connected with the right slide plate 12 in accordance with the position shown in the drawing and supports a support plate 34 which is rotatably mounted about axis 35 so as to pivot thereabout. A drive or take up mechanism 36 is mounted on the support plate 34 which can be brought into engagement by means of a cam wheel 37 with a tooth gear of a coil flange 38 of the wind-up element of the inerted mini-cassette.

The drive mechanism 36 consists of a double gear 39, which is in engagement with the rack gear portion of the right side slide 12 by means of a gear step and which drives a further double gear 37 by means of an intermediary wheel therebetween. The further double gear is a cam gear 37 engageable with the coil flange 38 of the mini-cassette. The support plate 34 and thereby the drive 36 mechanism is brought into engagement position by means of a tension spring supported by slide 12' biasing the plate 34 and accordingly gear 38 into engagement with flange 38, as shown in FIG. 4. The drive, that is, the cam wheel 37 and the geared coil flange 38 the mini-cassette remains in engagement until the mini-cassette 2 has almost reached its initial closed position, moving along with side slide 12' as it is being withdrawn from the housing 1. Shortly before abutment of the two cassette half parts of the mini-cassette 2, a lifting element 40 mounted on the end of side slide 12 engages the support plate 34 of the drive and releases the engagement of the cam wheel 37 from the coil flange 38 of the mini-cassette 2.

Note that the two side slides 12, 12' are connected with a tension spring 41. This tension spring acts as an accumulator which is placed under the tension by pulling out of the side slide 12, 12' during the opening of the housing 1 and assures that upon the closing of the lid 5 and the release of slides 12, 12' all required movements function occur automatically.

A short summary of the individual manipulations and functional operations is as follows. The lid 5 of the container 1 can only be opened after the two side slides 12, 12' are pulled out at which time the mini-cassette 2 can then be inserted into the container 1. Guide shoulders on the mini-cassette 2 assures a correct positioning of the cassette in the container 1. When inserting the mini-cassette 2, the centering pins 15, 15' enter into the mini-cassette 2 and release the locking means holding it together, while simultaneously anchoring the mini-cassette section on respective sliding plates 13, 13'.

When the lid 5 of the housing 1 is closed, the locking shoulders 31, 31' of the release slides 28, 28' in the lid 5 enter into corresponding recesses of the mini-cassette 2 while releasing the wind-up locking of the cassette. Simultaneously, the side slides 12, 12' are released and the half parts of the mini-cassette are pulled apart in the housing 1 by means of the accumulator 41 and are brought to the required axial distance for use for example in home video devices. The pivot arms 10, 10' with the tape guiding elements simultaneously bring the magnetic tape into the position required in accordance with the standard or larger size cassette utilized. This total process is done in a dampened manner due to perhaps damping springs. Upon completion, expansion of the cassette sections, pawls 22 engage, through slots in the cassette to prevent a loosening of the magnetic tape. The housing 1 with the mini-cassette 2 can now be handled like a standard reversible cassette for the home video device. When introducing the container into the home video device etc., the locking of the wind-up coils are released due to withdrawing of the pawls 22.

When removing the mini-cassette 2 from the housing 1, the side slides 12, 12' have to be withdrawn. In this procedure, in addition to the aforenoted and remainder, to enable reverse operation, during the process of the pulling apart of the side slides 12, 12' the drive mechanism 36 is driven by the engagement with the rack gear part of a side slide 12, this engaging coil winding flange 38 via cam gear 37, thus winding the superflous magnetic tape which results from pushing the two cassette parts together. The lifting device 40 returns the drive back into its initial unengaged position by pivoting it away from coil flange 38 and is anchored and prior to removal of the mini-cassette 2. Withdrawal of slides 12, 12' also serve to engage the pawls 27, 27' keeping the lid closed, releasing the lid 5 enabling removal of the cassette 2.

Thus by the aforenoted invention, its objects, advantages and others are realized, and although a preferred embodiment has been disclosed in detail, its scope should not be limited thereby, rather its scope should be determined by that of the appended claims.

What is claimed is:

1. A housing for receiving an expandable tape cassette comprising at least two sections containing respective winding spools of the tape cassette between which tape runs, with the sections movable with respect to each other so as to vary the distance between the spools and accordingly the running length of the tape therebetween with the housing adapting the cassette for use in tape playing and/or recording devices having different cassette size requirements, said housing comprising:

a substantially rectangular frame having at least one open side providing access to the frame interior;

plate means movably supported by said frame and adapted to receive the tape cassette sections with movement of said plate means causing respective movement of the sections positioned thereon;

pivot means supported by said frame and engageable with a portion of tape running between the spools so as to increase the length of the tape adjacent the open side from a first length to a second length and guiding the tape at said second length during the running of the tape between the spools of the cassette;

slide means coupled with said plate means and said pivot means and movable from a first position to a second position whereupon said movement of said slide means causes the movement of said plate means and accordingly separating the cassette sections thereon and accordingly the winding spools to a predetermined point while pivoting the pivot means so as to increase the running length of the tape along the open side of the frame and the movement from the second position to the first position returns the plate means and pivot means to their initial position.

2. The housing in accordance with claim 1 which further includes take up means disposed in said frame and coupled to side slide means and activated by movement thereof, said take up means being engageable with at least one winding spool of the tape cassette as said slide means goes from the second position to the first position so as to cause the rotation of the spool in a direction to take up thereon an amount of tape between the winding spools of the tape cassette approximately equal to the difference in length of the first and second length.

3. The housing in accordance with claim 1 which further includes means biasing said slide means to move automatically from the first position to the second position; and said slide means being releasably held in said first position.

4. The housing in accordance with claim 3 which includes a pivotable lid coupled to said housing pivotal between a closed and open position to allow the insertion of the tape cassette therein; means releasing said slide means from said first position so as to allow it to move to the second position when said lid is in the closed position, and locking said lid in the closed position until the slide means moves towards the first position, at which time said lid is unlocked.

5. A housing for receiving an expandable tape cassette comprising at least two sections containing respective winding spools of the tape cassette between which tape runs with the sections movable with respect to each other so as to vary the distance between the spools and accordingly the running length of the tape therebetween, with the housing adapting the cassette for use in tape playing and/or recording devices having different cassette size requirements, said housing comprising:

a rectangular frame housing, a bottom plate and a pivotable lid oppositely disposed thereto allowing insertion of the tape cassette into the frame, said frame having at least one open side;

at least two plates means supported by the bottom plate and movable in a direction substantially parallel to the open side;

respective centering pins on said plates engageable with receptacles positioned on respective sections of the cassette so as to center the tape cassette thereon;

pivot means supported by said frame and engageable with a portion of the tape running between the spools so as to increase the running length of the tape from a first length to a second length and guiding the tape at said second length during the running of the tape between the spools of the cassette; and slide means coupled with said plates and said pivot means, and movable from a first position to a second position, the movement of which automatically causes the movement of said plates to separate and accordingly separate the cassette sections thereon and accordingly the winding spools to a predetermined point while pivoting the pivot means so as to increase the running length of the tape along the open side of the frame; and the movement of the slide means from the second position to the first position automatically causing the respective plates to return to their initial positions and the pivot means to return to an unpivoted position.

6. The housing in accordance with claim 5, wherein the respective centering pins are disposed vertically and opposite of each other on the plates and center and engage locking members of the tape cassette that hold the cassette sections together, so as to unlock said sections upon insertion of the tape cassette into the housing.

7. The housing in accordance with claim 5 which includes means locking the lid upon closing thereof and unlocking the lid when said slide means moves from said second position.

8. The housing in accordance with claim 5 which includes accumulator means coupled to said slide means biasing the slide means to move from the first position to the second position; and wherein winding said accumulator results from the slide means moving from the second to the first position.

9. The housing in accordance with claim 8 wherein the accumulator is a tension spring positioned between at least two oppositely positioned slide members.

10. The housing in accordance with claim 8 which includes means releasably holding the slide means in the first position until said lid is closed at which time the slide means is released; and means locking said lid closed until said slide means moves from the second position.

11. The housing in accordance with claim 5 wherein said slide plate means includes at least two slide plates movable parallel to that of the open side, said slide means includes at least two slide members positioned adjacent each other along their longitudinal axis, each slide member movable parallel to that of the open side and coupled with respective slide plate members, each sliding plate member having respective cam pins which engage respective pivot means so as to coordinate movement of said pivot means and said slide plates during separation of the cassette sections.

12. The housing in accordance with claim 5 wherein the lid is provided with at least two unlocking slides for engaging the means locking the winding coils of the cassette upon closing the lid so as to release the coil windings, said unlocking slide being movable with the cassette sections as they are separated and joined together.

13. The housing in accordance with claim 11 which includes a take up means rotatably engaging a winding flange on a winding coil of the cassette when said slide members move from the second to the first position and winds a short tape length onto the winding coil.

14. The housing in accordance with claim 11 wherein the slide members are locked in the first position and are released by a closing of the lid.

15. The housing in accordance with claim 11 which includes locking means which prevents rotation of the winding coils of the cassette until the housing is inserted into a recording/playback device.

16. The housing in accordance with claim 15 wherein said locking means includes locking slides positioned perpendicular to and at each end of the open side of the frames and engageable with the device whereupon said locking slides enter into and release respective pawls from engaging a gear flange coupled with the winding spools thereby freeing the spools movement.

17. In combination a housing and a tape cassette insertable therein so as to adapt the tape cassette for use in tape recording and/or playback devices having different cassette size requirements, said tape cassette comprising at least two sections containing respective winding coils between which tape runs, with the sections movable with respect to each other so as to vary the distance between the winding spools of the cassette and accordingly the running length of the tape therebetween; said housing comprising:

- a rectangular frame housing, a bottom plate and a pivotable lid oppositely disposed thereto allowing insertion of the tape cassette into the frame, said frame having at least one open side;
- at least two plates supported by the bottom plate and movable in a direction substantially parallel to the open side;
- respective centering pins on said plates engageable with receptacles positioned on respective sections of the cassette so as to center the tape cassette thereon;
- pivot means supported by said frame and engageable with a portion of the tape running between the spools so as to increase the running length of the tape from a first length to a second length and guiding the tape at said second length during the running of the tape between the spools of the cassette; and
- slide means coupled with said plates and said pivot means, and movable from a first position to a second position, the movement of which automatically causes the movement of said plates to separate and accordingly separate the cassette sections thereon and accordingly the winding spools to a predetermined point while pivoting the pivot means so as to increase the running length of the tape along the open side of the frame; and the movement of the slide means from the second position to the first position automatically causing the respective plates to return to their initial positions and the pivot means to return to an unpivoted position.

18. The housing in accordance with claim 17, wherein the respective centering pins are disposed vertically and opposite of each other on the plates and center and engage locking members of the tape cassette that hold the cassette sections together, so as to unlock said sections upon insertion of the tape cassette into the housing.

19. The housing in accordance with claim 17, which includes means locking the lid upon closing thereof and unlocking the lid when said slide means moves from said second position.

20. The housing in accordance with claim 17, which includes accumulator means coupled to said slide means biasing the slide means to move from the first position to the second position; and winding said accumulator results from the slide means moving from the second to the first position.

21. The housing in accordance with claim 20, wherein the accumulator is a tension spring positioned between at least two oppositely positioned slide members.

22. The housing in accordance with claim 20, which includes means releasably holding the slide means in the first position until said lid is closed at which time the slide means is released; and means locking said lid closed until said slide means moves from the second position.

23. The housing in accordance with claim 17, wherein said slide plate means includes at least two slide plates movable parallel to that of the open side, said slide means includes at least two slide members positioned adjacent each other along their longitudinal axis, each slide member movable parallel to that of the open side and coupled with respective slide plate members, each sliding plate member having respective cam pins which engage respective pivot means so as to coordinate movement of said pivot means and said slide plates during separation of the cassette sections.

24. The housing in accordance with claim 23, wherein the lid is provided with at least two unlocking slides for engaging the means locking the winding coils of the cassette upon closing the lid so as to release the coil windings, said unlocking slide being movable with the cassette sections as they are separated and joined together.

25. The housing in accordance with claim 23, which includes a take up means rotatably engaging a winding flange on a winding coil of the cassette when said slide members move from the second to the first position and winds a short tape length onto the winding coil.

26. The housing in accordance with claim 23, wherein the slide members are locked in the first position and are released by a closing of the lid.

27. The housing in accordance with claim 23, which includes locking means which prevents rotation of the winding coils of the cassette until the housing is inserted into a recording/playback device.

28. The housing in accordance with claim 27, wherein said locking means includes locking slides positioned perpendicular to and at each end of the open side of the frames and engageable with the device whereupon said locking slides enter into and release respective pawls from engaging a gear flange coupled with the winding spools thereby freeing the spools movement.

* * * * *